United States Patent Office 2,693,493
Patented Nov. 2, 1954

2,693,493

SEPARATION OF OXO ALCOHOLS

Jeffrey H. Bartlett, Westfield, Frederick Knoth, Jr., Sayreville, and Joseph Stewart, Cranford, N. J., assignors to Standard Oil Development Company, a corporation of Delaware No Drawing. Application December 12, 1951,
Serial No. 261,368

1 Claim. (Cl. 260—639)

This invention relates to the separation of Oxo alcohols from mixtures thereof with organic materials boiling in approximately the same temperature range. Most particularly this invention relates to the separation of $C_{12}$–$C_{20}$ or higher Oxo alcohols from mixtures thereof with other organic materials, principally hydrocarbons, boiling in approximately the same temperature range.

Various processes for the production of $C_2$ and higher alcohols conventionally result in the production of other organic materials, usually hydrocarbon in nature. In many cases the distillation of the desired alcohol from the crude product gives a distillate of alcohol or alcohols and organic materials boiling in the same range. Separation of the alcohol or alcohols therefrom represents a distinct problem, which has been attacked in many ways.

An example of the obtaining of alcohols with organic materials boiling in approximately the same temperature range occurs in the well-known Oxo process for the production of primary branched alcohols (see, e. g., U. S. Patent No. 2,327,066 and U. S. Bureau of Mines Publication RI 4270, "Critical Review of Chemistry of the Oxo Synthesis, etc." 1948). The term "Oxo process" is well understood in the art as referring to a process wherein an olefin feed is first reacted or "oxonated" with carbon monoxide and hydrogen at a temperature between 120° and 250° C., and under a pressure of about 150 to 400 atmospheres in the presence of a cobalt or similar catalyst, which may be introduced in the form of a fatty acid salt, to form aldehydes in accordance with the following reaction:

$$C_nH_{2n} + H_2 + CO \rightarrow C_nH_{2n+1}CHO$$

The aldehydes so formed are then catalytically hydrogenated to form the desired alcohols as follows:

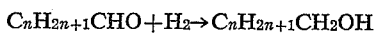
$$C_nH_{2n+1}CHO + H_2 \rightarrow C_nH_{2n+1}CH_2OH$$

The olefinic feed stocks most readily available in large volumes for the Oxo reaction as outlined above are selected hydrocarbon streams derived from petroleum refinery sources.

The crude hydrogenated product on vacuum distillation yields the alcohol or alcohols in a mixture therewith of organic materials, principally aliphatic hydrocarbons, but including some olefins and other oxygenated compounds such as esters, acetals, etc., boiling in approximately the same range.

The separation of these alcohols from the indicated mixtures has been attempted in many manners, such as by solvent extraction, multi-stage distillation, chemical treating, etc., each of which has suffered from certain difficulties.

The present invention provides an improved method for obtaining alcohols in a relatively pure form from the indicated mixtures. The improved method comprises sulfating substantially only the alcohols contained in the mixture with a sulfating agent, neutralizing the acid organic layer containing the alcohol sulfates, conveniently extracting the organic layer with a light hydrocarbon to remove non-alcoholic materials and then with an aqueous alcohol solution to remove the alcohol sulfate salts. The latter are then regenerated by hydrolysis, with acid if desired, and thus reconverted to the alcohols in substantially pure form.

As stated above, this process is ideally adapted for the separation of $C_{12}$ and higher Oxo alcohols in mixtures thereof with organic materials boiling in approximately the same range. The separation is particularly effective for alcohols in the $C_{12}$ to $C_{20}$ range. These alcohols are conveniently prepared from olefins containing one less carbon atom. The olefins are obtained from sources such as the thermal cracking of petroleum, propylene polymerization, propylene butylene copolymerization, etc.

It is surprising to learn that the method taught herein is adapted for the separation of the alcohols in the indicated mixtures. While it had been known to sulfate alcohols, the method of this invention is particularly adapted for functioning as a novel means for separating the alcohols from difficulty separable mixtures and recovering them as alcohols.

The indicated alcohol mixtures are sulfated with "a sulfating agent" known in the art, such as concentrated sulfuric acid, oleum, sulfur dioxide and chlorine gas, sulfur trioxide, brom- and chlor-sulfonic acids in ethyl ether, etc., and their mixtures. Solvents may be used, such as ethyl ether, light hydrocarbons such as hexane, heptane, low-boiling petroleum ethers, etc. The sulfating agent is dispersed in the oil with the temperature kept in the range of −10° to 15° C. The sulfating agent may be added in several dumps and any sludge removed promptly between dumps. The amount of sulfating agent employed varies from 100 to 120 mol per cent in the alcohol content of the feed.

The sulfated alcohols in the acid organic layer separated from the sludge are subsequently neutralized with aqueous caustic soda, sodium carbonate, etc. The sodium salts are then extracted from the treated oil layer with aqueous alcohol solutions such as 50% aqueous isopropyl alcohol, 50% aqueous ethyl alcohol, etc. In general, water-soluble lower alcohols in the $C_1$ to $C_4$ range can be employed for the extraction, and the concentration of the alcohols in the aqueous extraction solution is in the range of 20 to 60 volume per cent.

The alkali used for the above-indicated neutralization can be dissolved directly in the aqueous alcohol and the steps thus combined, i. e., neutralization and extraction. Unchanged hydrocarbons and other materials are removed from the neutralized oil layer by extraction with light hydrocarbons such as pentane, hexane, heptane, and low molecular weight ethers, such as ethyl and isopropyl.

The alcoholic solution of the sodium alcohol sulfates can be further purified, that is, rendered salt-free by dehydration or extraction with an inorganic salt, e. g., sodium sulfate, sodium carbonate, etc., and the solvent removed leaving a salt- and oil-free alcohol sulfate. The addition of the salt to the alcohol solution results in a phase separation, i. e., an aqueous phase containing dissolved inorganic salts and an alcohol phase containing the alcohol sulfates. The lower alcohols can be distilled off. Since the alcohol sulfates obtained are detergents, if desired they need not be regenerated to the alcohols.

The regeneration of the alcohols is obtained by a hydrolysis treatment. The lower alcohol extractants can be first stripped off, or, if desired, subsequently removed from the finished higher alcohols. Hydrolysis of the sulfate is effected by refluxing the sulfate with an approximately equivalent amount of an aqueous inorganic acid such as hydrochloric, sulfuric, phosphoric, etc. The alcohol sulfates are thus converted to the alcohol. At the conclusion of the hydrolysis phase separation takes place into an upper predominantly alcohol product phase and a lower aqueous phase. The upper phase may be water washed to remove excess inorganic acids and stripped to remove dissolved lower alcohol. A purified alcohol product is thus obtained. The alcohol sulfates or alkyl sulfuric acids may also be hydrolyzed to the alcohol in the absence of acidic catalyst by treatment with steam or water at elevated temperatures and pressures.

The following examples are given to illustrate this invention:

Example 1

A mixture of .135 mole of crude 70% $C_{13}$–$C_{14}$ Oxo alcohol and 60 grams of anhydrous ethyl ether diluent was placed in a 500 ml. flask fitted with a stirrer, reflux condenser, dropping funnel, and thermometer. This mixture was cooled to 10° C. and a complex of 17.2 grams of chlorosulfonic acid and 30 grams of anhydrous ethyl ether was then added dropwise with vigorous stirring at such a rate that the temperature of the reaction remained between 10°–15° C. The contents of the flask were stirred for ½ hour at 10°–15° C. upon completion of addition of the acid-ether complex. The reaction products were poured over ice and neutralized with aqueous sodium hydroxide solution. The ether was evaporated on a steam bath and an equal volume of isopropyl alcohol was added to the product. The mixture was desalted at 40°–45° C. with anhydrous sodium carbonate. The salt-free alcohol layer was concentrated to 150–200 ml. by distillation. Water to 400 ml. was added to this concentrate, and this product was extracted with two 25 volume per cent portions of petroleum ether to remove any entrained or dissolved unreacted organic material. The raffinate was drum dried to produce an anhydrous sodium alcohol sulfate. This product was then hydrolyzed as follows: 0.12 mole of the sodium sulfate was placed in a 1 liter flask fitted with a reflux condenser, and 0.15 mole of aqueous 6 normal hydrochloric acid was added. The mixture was refluxed for three hours to produce, after cooling, a two-phase system containing the recovered alcohol product. This alcohol product had a hydroxyl number of 0.433 centi-equivalent per gram, which is equivalent to an alcohol purity of 90%. By following this process the alcohol has been enriched from 70% to 90% purity in a single stage. This experiment demonstrates the efficacy with which the alcohol has been separated from the other organic materials, predominantly hydrocarbon, boiling in approximately the same temperature range.

*Example 2*

A mixture of 1.6 moles of crude $C_{12}$–$C_{20}$ alcohols obtained from the oxonation of the corresponding olefins containing 45% alcohol was placed in a 3 liter flask fitted with a reflux condenser, thermometer, stirrer, and a dropping funnel containing 500 ml. of heptane. This mixture was cooled to 5° C. and maintained at this temperature during the addition of 1.8 moles of a complex of chlorosulfonic acid and ethyl ether. At the end of the reaction time, 20 to 30 minutes, the contents of the flask were stirred for an additional 30 minutes at 10°–15° C. The reaction product was poured over ice and neutralized with aqueous sodium hydroxide solution. The ether was evaporated on a steam bath and the residue extracted with heptane to remove unreacted components. The product layer was drum dried to yield the alcohol sodium sulfate. This product was then hydrolyzed as follows: 0.33 mole of the sulfate was placed in a 1 liter flask fitted with a reflux condenser and refluxed for 2½ hours to 3 hours after the addition of 0.41 mole of 6 normal hydrochloric acid. After cooling, two layers separated, the upper layer consisting of the purified alcoholic material. This product had a hydroxyl number of 0.366 centi-equivalent per gram, which corresponds to 94% pure alcohol. In this case the crude product was enriched by application of the process from 45% to 94% purity in a single stage.

It will be understood further that the foregoing examples have been given merely for purposes of illustration, but that other modifications of the present invention are possible without departing from the scope of the appended claim.

What is claimed is:

A process for separating and recovering a $C_{12}$–$C_{20}$ Oxo alcohol produced in a two-stage oxonation and reduction process from mixtures thereof with organic materials boiling in approximately the same temperature range, including principally aliphatic hydrocarbons, which comprises the steps of sulfating the mixture with concentrated sulfuric acid at a temperature in the range of −10° to 15° C. to convert the alcohol to an alcohol sulfate; separating an acid organic layer containing the alcohol sulfate from resultant sludge; neutralizing the acid organic layer; extracting the alcohol sulfate salt from the neutralized organic layer with an aqueous isopropyl alcohol solution of approximately 50% concentration; dehydrating the aqueous alcohol extract solution containing the alcohol sulfate salt with an inorganic salt selected from the class consisting of sodium sulfate and sodium carbonate whereby two phases are formed, an aqueous phase containing dissolved inorganic salts and an alcohol inorganic salt-free phase containing the alcohol sulfates; evaporating said alcohol phase to dryness to yield dry alcohol sulfate salt; and treating the alcohol sulfates with hydrochloric acid to regenerate the $C_{12}$–$C_{20}$ Oxo alcohol.

References Cited in the file of this patent

UNITED STATES PATENTS

| Number | Name | Date |
| --- | --- | --- |
| 2,022,274 | Brooks | Nov. 26, 1935 |
| 2,562,980 | Atwell | Aug. 7, 1951 |

OTHER REFERENCES

I. G. Farbenindustrie, German patent application O. Z. 12,360, TOM Reel 36 (English translation in Meyer translation "Oxo Process," vol. I, pages 17–19).